United States Patent
Bartle

(10) Patent No.: US 7,040,627 B1
(45) Date of Patent: May 9, 2006

(54) CINCHPAC SELF-LOADING ROTARY SHAFT SEAL

(76) Inventor: Joseph Bartle, 1133 Layton Rd., Philadelphia, PA (US) 19115

(*) Notice: Subject to any disclaimer, the term of this patent is extended or adjusted under 35 U.S.C. 154(b) by 61 days.

(21) Appl. No.: 10/630,723

(22) Filed: Jul. 31, 2003

Related U.S. Application Data

(60) Provisional application No. 60/427,968, filed on Nov. 21, 2002.

(51) Int. Cl.
*F16J 15/34* (2006.01)

(52) U.S. Cl. ............ 277/370; 277/390; 277/399; 277/641; 277/648

(58) Field of Classification Search ........... 277/390, 277/396, 370, 399, 573, 648, 641, 642, 574, 277/577, 911–912; 403/223, 225, 228
See application file for complete search history.

(56) References Cited

U.S. PATENT DOCUMENTS

| 2,322,867 | A | * | 6/1943 | Meyer | 277/397 |
| 2,561,694 | A | * | 7/1951 | Gilbert, Sr. | 277/366 |
| 2,950,932 | A | * | 8/1960 | Gilbert | 277/365 |
| 3,368,819 | A | * | 2/1968 | Otto | 277/366 |
| 3,504,917 | A | | 4/1970 | Malmstrom | |
| 3,523,692 | A | * | 8/1970 | Otto | 277/366 |
| 3,588,127 | A | | 6/1971 | Coleman | |
| 3,988,026 | A | * | 10/1976 | Kemp, Jr. | 277/369 |
| 4,094,518 | A | * | 6/1978 | Cox | 277/367 |
| 4,188,039 | A | * | 2/1980 | Krisak et al. | 277/387 |
| 4,342,461 | A | | 8/1982 | Lindsay | |
| 4,444,402 | A | * | 4/1984 | Escue et al. | 277/397 |
| 4,502,694 | A | | 3/1985 | Uhrner | |
| 5,024,450 | A | * | 6/1991 | Hawley et al. | 277/366 |
| 5,082,294 | A | * | 1/1992 | Toth et al. | 277/551 |
| 5,409,241 | A | * | 4/1995 | Bowers | 277/366 |
| 6,203,024 | B1 | * | 3/2001 | Liebich et al. | 277/634 |
| 6,334,713 | B1 | * | 1/2002 | Chu | 384/464 |

* cited by examiner

*Primary Examiner*—Alison K. Pickard
(74) *Attorney, Agent, or Firm*—Patent & Trademark Services, Inc.; Joseph H. McGlynn

(57) ABSTRACT

A seal assembly which is secured to a rotating shaft and which seals around the shaft. The seal assembly has molded grooves adjacent to the shaft which grasp the shaft and prevent leakage.

9 Claims, 2 Drawing Sheets

CINCHPAC SELF-LOADING ROTARY SHAFT SEAL

Applicant claim priority for Provisional application Ser. No. 60/427,968, filed Nov. 21, 2002.

BACKGROUND OF THE INVENTION

This invention relates, in general, to a seal system, and, in particular, to a seal system which is secured to a rotating shaft and which seals around the exterior of the shaft.

DESCRIPTION OF THE PRIOR ART

In the prior art various types of have been proposed. For example, U.S. Pat. No. 4,502,694 to Uhrner discloses a ring seal which seals due to the force imparted by a spring.

U.S. Pat. No. 4,342,461 to Lindsay discloses a seal for a rotating shaft which utilizes a flexible diaphragm to make the seal self-aligning.

U.S. Pat. No. 3,588,127 to Coleman discloses an L-shaped elastomeric cuff for sealing around a rotating shaft.

U.S. Pat. No. 3,504,917 to Malmstrom discloses a seal with an axial projecting finger to engage a wall.

SUMMARY OF THE INVENTION

The present invention is directed to a seal system which is secured to a rotating shaft and which seals around the shaft. The seal system has molded grooves adjacent to the shaft which grasp the shaft and prevent leakage.

It is an object of the present invention to provide a new and improved rotary seal system.

It is an object of the present invention to provide a new and improved rotary seal system attached to a shaft to prevent leakage while the shaft is rotating.

It is an object of the present invention to provide a new and improved rotary seal system which has built in wear provisions to maintain seal life.

These and other objects and advantages of the present invention will be fully apparent from the following description, when taken in connection with the annexed drawings.

DESCRIPTION OF THE PREFERRED EMBODIMENT

Figure 1:
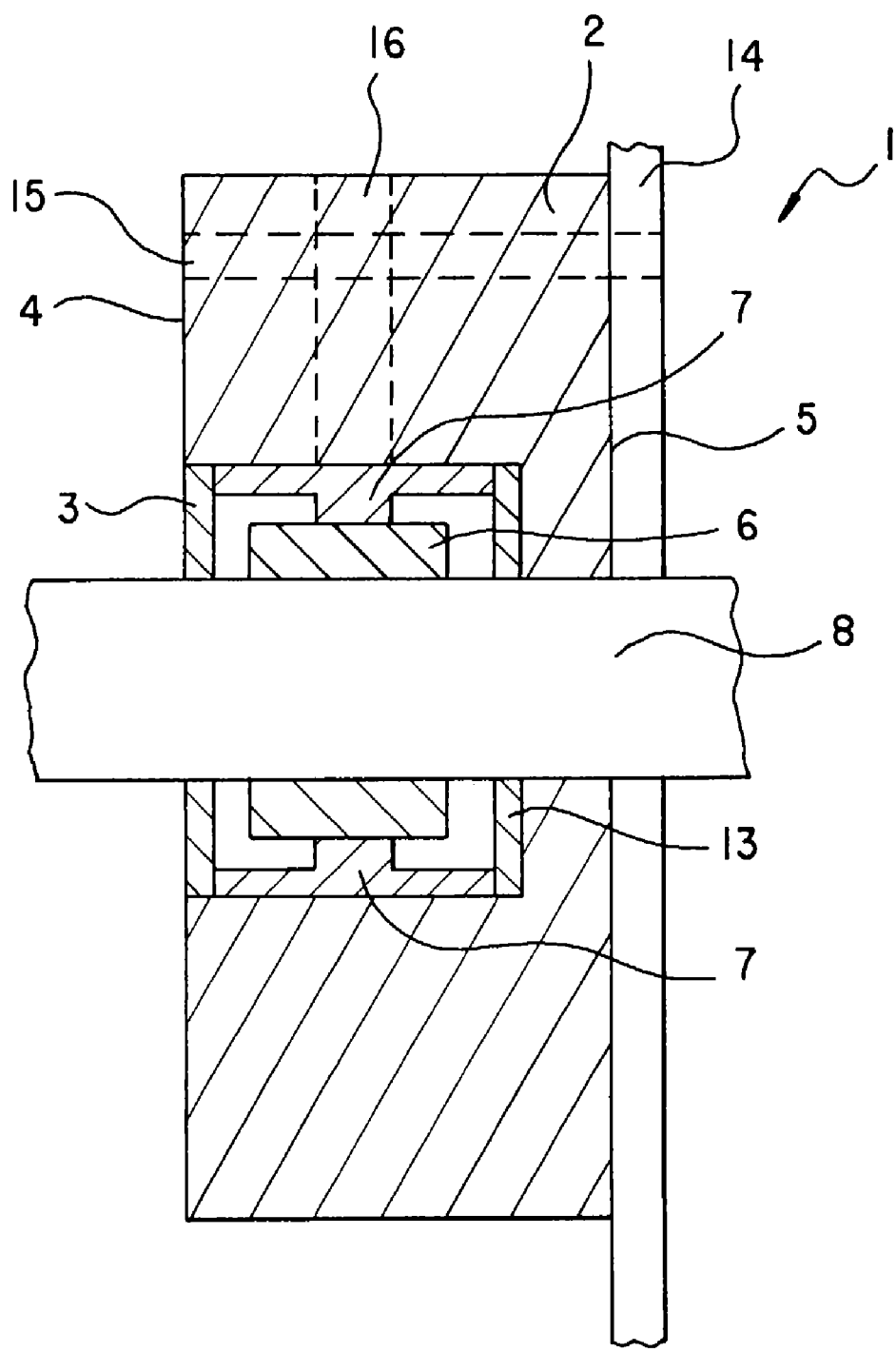
FIG. 1 is sectional view of the present invention.
Figure 3:
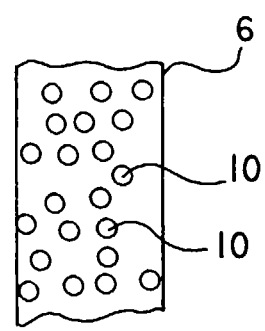
FIG. 3 is a partial view of the internal surface of the seal element of the present invention.

Referring now to the drawings in greater detail, FIG. 1 shows the present invention 1 as assembled and placed on the rotating shaft 8 (see also FIG. 3). The seal element 6 is enclosed in a body block 2, which has a front portion 4 and a back portion 5. An outer ring plate 3 is secured to the body block 2 by any conventional means such as, but not limited to, a friction fit between the outer ring plate 3 and the body block 2. Body block 2 is preferably made from polypropylene, although other materials could be used without departing from the scope of the invention.

The outer ring plate 3, which is preferably made from steel or stainless steel, is secured to body block 2 by fasteners as explained above. A rotator cup 7, which is preferably made from a polymer filled material, is mounted on a silicon elastomeric boot 6 and abuts the inner ring plate 13 adjacent the rear of the body block 2. The body block 2 is mounted to a bulkhead 14 by conventional fasteners which extend through apertures 15 and into the bulkhead 14.

Figure 2:
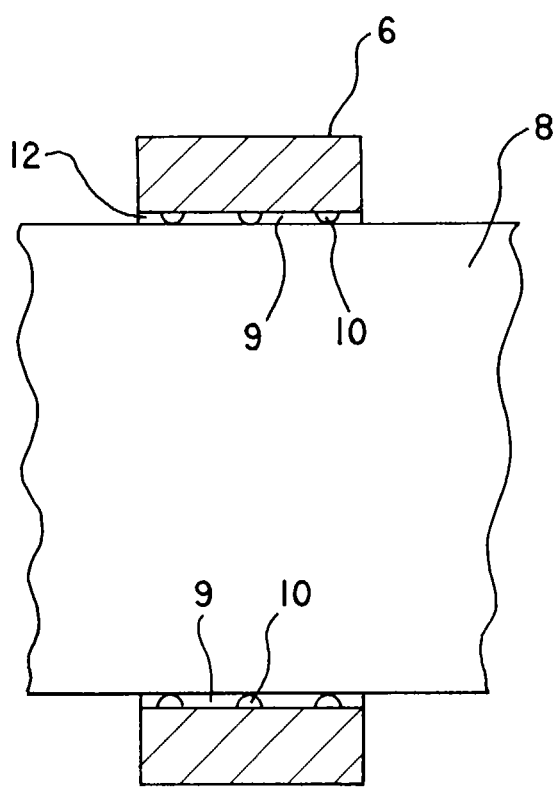
FIG. 2 is a partial view of the seal elemnet of the seal system of the present invention on a shaft.

Secured to the rotator cup 7 is a shaft seal 6. The shaft seal 6 can be a unitary part of the rotator cup 7 or it could be a separate part which is attached to the rotator cup 7 by any conventional means. The shaft seal 6 (see FIGS. 1 and 2) has an aperture 12 extending therethrough from the front of the seal to the back of the seal. The rotating shaft 8 extends through this aperture.

Molded into the sides of the aperture 12 are a plurality of lands 10 and the areas between the lands form grooves 9. The inner dimension between oppositely formed lands is equal to, or slightly smaller than the outer circumference of the shaft 8 so the lands and the outer circumference of the shaft form a tight fit which will prevent leakage of any powder from inside the bulkhead 14 along the outer surface of the shaft 8.

A problem with this type of arrangement is that as the shaft rotates it tends to wear the seal 6. As wear occurs over a period of time, the engagement between the seal 6 and the shaft 8 will allow leakage of liquids or powders from inside the bulkhead 14 to the exterior of the bulkhead along the shaft 8. In order to prevent this, the present invention limits the normal wear to the area of the lands. As the lands wear down, during use, a seal is maintained between the lands of the present invention and the outer surface of the shaft, thereby preventing leaks.

The distance between lands 10 on one side of the aperture 12 in the boot 6 and another side of the aperture 12 in the boot 6 is smaller than the external diameter of the shaft 8. This creates a tight fit between the shaft and the lands on the boot. The boot 6 remains static with the shaft 8, that is the boot rotates with the shaft to reduce wear on the lands 10.

The lands 10 form a labyrinth seal between the boot and the shaft since they are positioned in a nonsymetrical pattern, as shown in FIG. 3, and therefore, eliminate leakage paths between the boot and the shaft. In addition, the lands 10 focus a closing force onto the ring plate 3 is secured into block 2.

The present invention is assembled by first sliding the body block 2, the seal 6 and the inner ring plate 13 onto a shaft 8, and then this assembly is mounted to the bulkhead 14 containing processing equipment (not shown). Next, outer ring plate 3 is secured to block 2 and pressure is applied horizontally to the rotator cup 7 which will deform in a vertical direction toward the shaft 8. Since the rotator cup 7 is constrained between the ring 3, the ring 13 and the body block 2 it can't more in any other direction. This will compress the seal 6 in a vertical direction toward the shaft, as shown in FIG. 1, which will cause the seal 6 (and the lands 10) to deform and provide a tight engagement with the shaft 8.

A purge port 16 is provided in block 2 so gas (air or nitrogen), grease or a liquid can be introduced through the purge port to purge the internal surfaces of the seal 6 and prevent a contaminant from crossing the seal interface.

The present invention replaces conventional lip seals and mechanical packing which remain dynamic with the shaft. That is, there is relative rotation between the seals and the shaft. Since there is relative rotation between the seals and the shaft, damage can occur to the seal and/or the shaft, which will require down time while maintenance is performed. The seal of the present invention will not be subject to the wear and tear associated with conventional seals, and do not need to be adjusted or tightened over time to compensate for wear.

Although the Cinchpac Self-loading Rotary Shaft Seal and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

I claim:

1. A seal assembly for a rotating shaft, said seal assembly comprising:
   a seal element,
   said seal element having an aperture extending therethrough,
   said seal element having means for securing said seal element to an external portion of a rotating shaft to rotate with the shaft,
   said means being formed in said aperture extending through said seal element, and
   wherein said means are lands, and
   wherein there are grooves extending between said lands, and
   wherein said grooves form passageways between said lands, and
   wherein said passageways are serpentine and form a labyrinth seal to prevent leakage between the seal element and shaft.

2. The seal assembly as claimed in claim 1, wherein said aperture extends horizontally through said seal element.

3. The seal assembly as claimed in claim 1, wherein said means comprises a plurality of lands extending around said aperture.

4. The seal assembly as claimed in claim 1, wherein said seal system has means for compressing said seal element around said rotating shaft.

5. The seal assembly as claimed in claim 4, wherein said means for compressing said seal element around said rotating shaft comprises a body block,
   said body block having an aperture therein,
   a rotator cup positioned in said aperture in said body block, and
   said rotator cup engages an external surface of said seal element, and
   means for compressing said rotator cup against said seal element, which in turn compresses said seal element.

6. The seal assembly as claimed in claim 5, wherein said means for compressing said rotator cup against said seal element comprises at least one plate.

7. The seal assembly as claimed in claim 6, wherein said at least one plate is secured to said body block and engages said rotator cup.

8. The seal assembly as claimed in claim 5, wherein said body block has means for flushing an area around said seal element.

9. The seal assembly as claimed in claim 8, wherein said means for flushing an area around said seal element comprises a passageway extending from an exterior portion of said body block.

* * * * *